(12) United States Patent
Jo et al.

(10) Patent No.: US 11,137,612 B2
(45) Date of Patent: Oct. 5, 2021

(54) ELECTRONIC DEVICE WITH ADJUSTABLE SUPPORT STRUCTURES

(71) Applicant: Apple Inc., Cupertino, CA (US)

(72) Inventors: Yoonhoo Jo, San Francisco, CA (US); Thomas E. Degen, Cupertino, CA (US); Julian Hoenig, San Francisco, CA (US); Julian Jaede, San Francisco, CA (US); Aiden D. Mossop, Sunnyvale, CA (US); Atif H. Naqvi, Fremont, CA (US); Scott Y. Oshita, Los Altos, CA (US); Heidi Williamson, San Francisco, CA (US); Edward W. Wong, San Jose, CA (US); Timon A. Wright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/562,293

(22) Filed: Sep. 5, 2019

(65) Prior Publication Data

US 2020/0081259 A1 Mar. 12, 2020

Related U.S. Application Data

(60) Provisional application No. 62/730,480, filed on Sep. 12, 2018.

(51) Int. Cl.
*G02B 27/01* (2006.01)

(52) U.S. Cl.
CPC ..... *G02B 27/0176* (2013.01); *G02B 27/0179* (2013.01); *G02B 2027/0154* (2013.01); *G02B 2027/0187* (2013.01)

(58) Field of Classification Search
CPC .... G02B 2027/0154; G02B 2027/0156; G02B 2027/0158; G02B 2027/0161;
(Continued)

(56) References Cited

U.S. PATENT DOCUMENTS 5,539,422 A 7/1996 Heacock et al.
5,583,795 A * 12/1996 Smyth .................. A61B 3/0025
359/630

(Continued)

FOREIGN PATENT DOCUMENTS

CN 202758141 2/2013
CN 103323949 A 9/2013
(Continued)

*Primary Examiner* — Tom V Sheng
(74) *Attorney, Agent, or Firm* — Treyz Law Group, P.C.; Kendall W. Abbasi

(57) ABSTRACT

A head-mounted device may include a housing structure, a display module mounted in the housing structure, and adjustable support structures coupled to the housing structure. The adjustable support structures may include a first portion that rests against a user's forehead and second and third portions that rest against the user's cheeks or temples. In some arrangements, the adjustable support structures include posts with adjustable lengths, telescoping layers of material, inflatable structures, and/or elastomeric materials that expand and retract to accommodate different face shapes and sizes. In some arrangements, the adjustable support structures include a cable located in a flexible member. When pressure is applied to a forehead portion of the flexible member, the cable pulls the temple portions of the flexible member towards each other. In some arrangements, the adjustable support structures include a movable member that pivots about a pivot axis.

17 Claims, 11 Drawing Sheets

(58) Field of Classification Search
CPC .... G02B 2027/0178; G02B 2027/0181; G02B 2027/0187; G02B 27/017; G02B 27/0176; G02B 27/0179
USPC .................................................................. 345/8
See application file for complete search history.

(56) References Cited

U.S. PATENT DOCUMENTS

| | | | |
|---|---|---|---|
| 6,680,802 B1 | | 1/2004 | Ichikawa et al. |
| 6,751,811 B1 | | 6/2004 | Hill |
| 10,895,751 B1 * | | 1/2021 | Yee .................... G02B 27/017 |
| 2003/0115661 A1 * | | 6/2003 | Dobbie .............. G02B 27/0176 2/422 |
| 2004/0181858 A1 * | | 9/2004 | Soto ...................... G02B 7/002 2/448 |
| 2009/0059501 A1 * | | 3/2009 | Yamaguchi ............. A61F 9/029 361/679.27 |
| 2009/0158501 A1 | | 6/2009 | Lowe et al. |
| 2012/0062445 A1 | | 3/2012 | Haddick et al. |
| 2012/0249797 A1 | | 10/2012 | Haddick et al. |
| 2016/0195723 A1 * | | 7/2016 | Murray .............. G02B 27/0176 359/631 |
| 2017/0082859 A1 * | | 3/2017 | Drinkwater ........ G02B 27/0176 |
| 2017/0103573 A1 * | | 4/2017 | Drinkwater ........ G02B 27/0179 |
| 2017/0172406 A1 * | | 6/2017 | Pamplona ............. A61B 3/0025 |
| 2017/0322410 A1 * | | 11/2017 | Watson ................. G02B 21/365 |
| 2018/0092706 A1 * | | 4/2018 | Anderson .............. A61B 90/37 |
| 2018/0095497 A1 * | | 4/2018 | Hsu ........................... A61F 9/06 |
| 2018/0284468 A1 * | | 10/2018 | Parker .................... G02B 30/36 |
| 2019/0072772 A1 * | | 3/2019 | Poore ..................... G06F 3/013 |
| 2019/0079301 A1 * | | 3/2019 | Sauers ............... G02B 27/0176 |

FOREIGN PATENT DOCUMENTS

| | | |
|---|---|---|
| CN | 103430534 A | 12/2013 |
| CN | 204790191 U | 11/2015 |
| CN | 205826967 U | 12/2016 |
| CN | 108152969 A | 6/2018 |

* cited by examiner

ELECTRONIC DEVICE WITH ADJUSTABLE SUPPORT STRUCTURES

This application claims the benefit of provisional patent application No. 62/730,480, filed Sep. 12, 2018, which is hereby incorporated by reference herein in its entirety.

FIELD

This relates generally to electronic devices and, more particularly, to wearable electronic device systems.

BACKGROUND

Electronic devices are sometimes configured to be worn by users. For example, head-mounted devices are provided with head-mounted structures that allow the devices to be worn on users' heads. The head-mounted devices may include optical systems with lenses. The lenses allow displays in the devices to present visual content to users.

Users have faces of different shapes and sizes. This can pose challenges when a head-mounted device is to be used by multiple users. If care is not taken, a head-mounted device may not fit well for certain users.

SUMMARY

A head-mounted device may have a display that displays content for a user. Head-mounted support structures in the device support the display on the head of the user.

The head-mounted device may have lenses in lens modules. A left positioner may be used to position a left lens module. A right positioner may be used to position a right lens module. The left and right lens modules may have respective left and right lenses and respective left and right portions of a display.

To accommodate users with different face shapes and sizes, the head-mounted device may include adjustable support structures coupled to the housing structure. The adjustable support structures may include a first portion that rests against a user's forehead and second and third portions that rest against the user's cheeks or temples. In some arrangements, the adjustable support structures may be configured to expand and retract to accommodate different face shapes and sizes. The adjustable support structures that expand and retract may include posts with adjustable lengths, telescoping layers of material, inflatable structures, and/or elastomeric materials.

In some arrangements, the adjustable support structures include a cable located in a flexible member. When pressure is applied to a forehead portion of the flexible member, the cable pulls the temple portions of the flexible member towards each other (e.g., towards the user's temples).

In some arrangements, the adjustable support structures may include a movable member that pivots about a pivot axis. The pivot axis may be located at a lower end of the movable member, an upper end of the movable member, or between the upper and lower ends of the movable member.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain a display formed from one or more display panels (displays) for displaying visual content to a user. A lens system may be used to allow the user to focus on the display and view the visual content. The lens system may have a left lens that is aligned with a user's left eye and a right lens that is aligned with a user's right eye.

Not all users have the same face shape or face size. To ensure that a wide range of users are able to comfortably view content on the display, the head-mounted device may be provided with adjustable support structures. The adjustable support structures may be used in adjusting the size and/or position of the head-mounted device to accommodate different face shapes and sizes.

Figure 1:
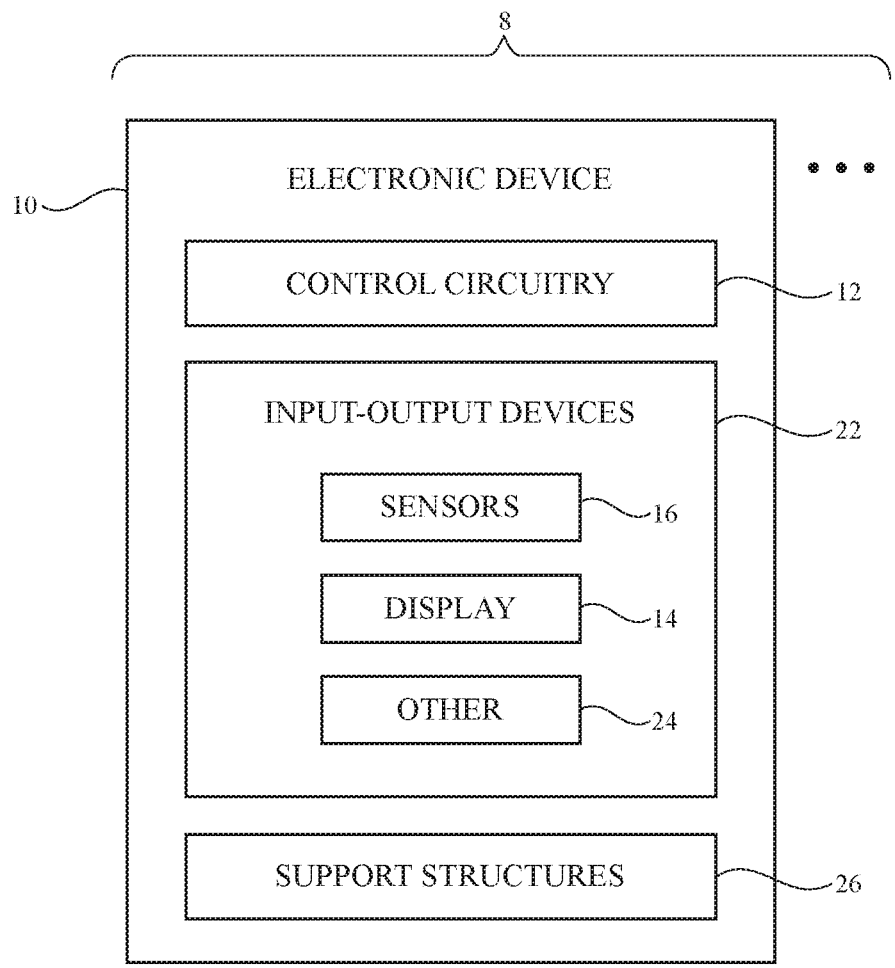
FIG. 1 is a schematic diagram of an illustrative electronic device such as a head-mounted device having adjustable support structures in accordance with an embodiment.

A schematic diagram of an illustrative system having an electronic device with adjustable support structures that help ensure satisfactory placement of lenses relative to a user's facial features is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc.

Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involved in processing three-dimensional facial image data, operations involving the adjustment of components using control signals, etc.). Control circuitry 12 may include wired and wireless communications circuitry. For example, control circuitry 12 may include radio-frequency transceiver circuitry such as cellular telephone transceiver circuitry, wireless local area network (WiFi®) transceiver circuitry, millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video and/or audio data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as display 14. In some configurations, display 14 of device 10 includes left and right display panels (sometimes referred to as left and right portions of display 14 and/or left and right displays) that are in alignment with the user's left and right eyes, respectively. In other configurations, display 14 includes a single display panel that extends across both eyes.

Display 14 may be used to display images. The visual content that is displayed on display 14 may be viewed by a user of device 10. Displays in device 10 such as display 14 may be organic light-emitting diode displays or other displays based on arrays of light-emitting diodes, liquid crystal displays, liquid-crystal-on-silicon displays, projectors or displays based on projecting light beams on a surface directly or indirectly through specialized optics (e.g., digital micromirror devices), electrophoretic displays, plasma displays, electrowetting displays, or any other suitable displays.

Display 14 may present computer-generated content such as virtual reality content and mixed reality content to a user. Virtual reality content may be displayed in the absence of real-world content. Mixed reality content, which may sometimes be referred to as augmented reality content, may include computer-generated images that are overlaid on real-world images. The real-world images may be captured by a camera (e.g., a forward-facing camera) and merged with overlaid computer-generated content or an optical coupling system may be used to allow computer-generated content to be overlaid on top of real-world images. As an example, a pair of mixed reality glasses or other augmented reality head-mounted display may include a display device that provides images to a user through a beam splitter, prism, holographic coupler, or other optical coupler. Configurations in which display 14 is used to display virtual reality content to a user through lenses are described herein as an example.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, buttons, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), fingerprint sensors and other biometric sensors, optical position sensors (optical encoders), and/or other position sensors such as linear position sensors, and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, and other electrical components. Device 10 may include circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support display(s) 14, sensors 16, other components 24, other input-output devices 22, and control circuitry 12. Support structures 26 may include adjustable support structures so that device 10 can fit to faces of different shapes and sizes.

Figure 2:
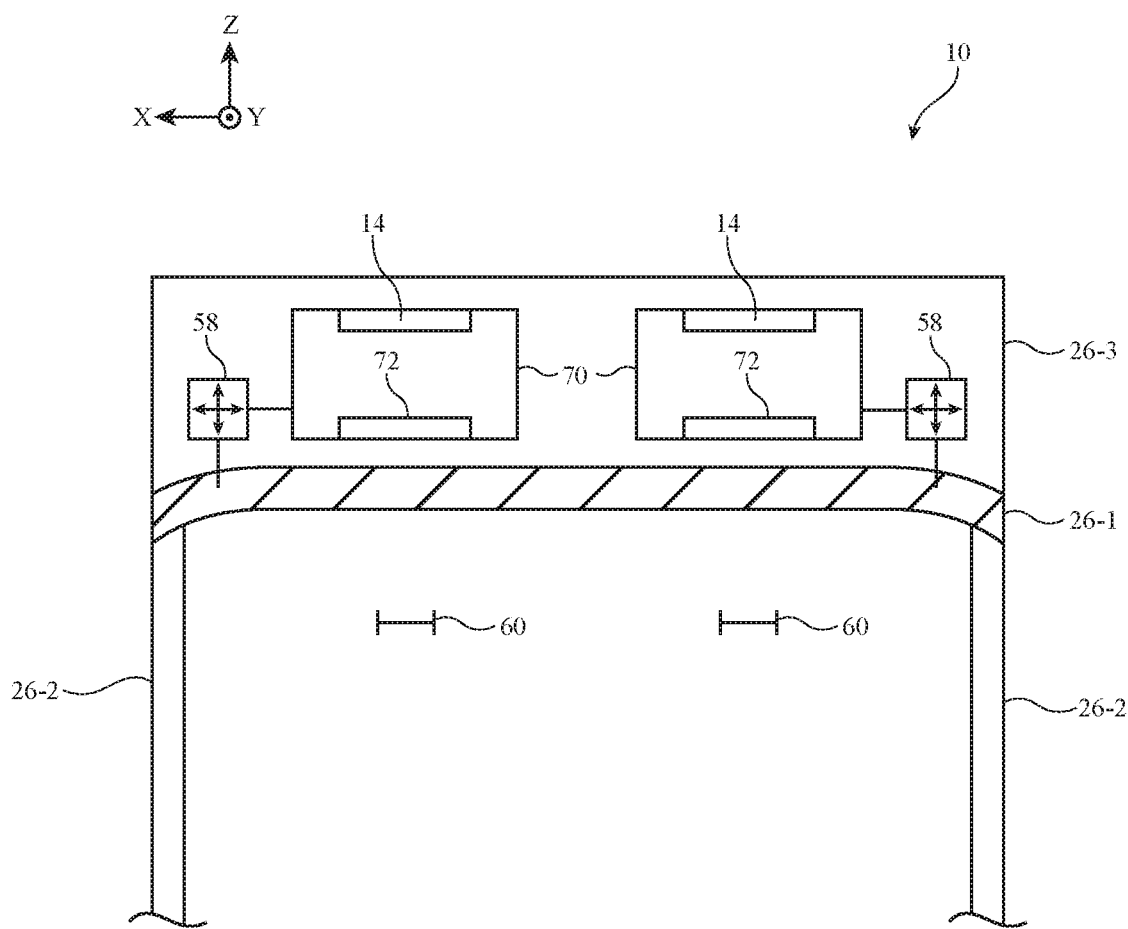
FIG. 2 is a top view of an illustrative head-mounted device having adjustable support structures in accordance with an embodiment.

FIG. 2 is a top view of electronic device 10 in an illustrative configuration in which electronic device 10 is a head-mounted device. As shown in FIG. 2, electronic device 10 may include support structures (see, e.g., support structures 26 of FIG. 1) that are used in housing the components of device 10 and mounting device 10 onto a user's head. These support structures may include, for example, support structures 26-1, 26-2, and 26-3. Support structures 26-3 may form a main unit (e.g., a main housing structure) with housing walls and other structures (e.g., exterior housing walls, lens module structures, etc.) for supporting display 14 and other optical and electrical components. Support structures 26-2 may include straps or other supplemental support structures that help to hold main unit 26-3 on a user's face and/or head so that the user's eyes are located within eye boxes 60. Support structures 26-1 may rest against the front of a user's face (e.g., a user's forehead, cheeks, temples, and/or nose) and may include padding, foam, and/or other soft materials for enhancing comfort. Support structures 26 such as support structures 26-1, 26-2, and 26-3 may be formed from metal, polymer (e.g., thermoplastic, thermosetting plastic, or other plastic), fabric, glass, ceramic, shape memory alloy, foam, elastomeric material, other materials, or combinations of these materials.

Some or all of support structures 26 may be adjustable. For example, support structures 26-2 (sometimes referred to as straps 26-2) may include adjustable straps to accommodate different head shapes and sizes. Support structures 26-1 may include adjustable structures for accommodating different face shapes and sizes. Support structures 26-1 may include adjustable structures that can be moved linearly (e.g., parallel to the X, Y, and/or Z axes of FIG. 2) and/or may include adjustable structures that can be rotated (e.g., rotated about the X, Y, and/or Z axes of FIG. 2). Accommodating different face shapes and sizes can help enhance user comfort while also ensuring that displays 14 are properly aligned with respect to the user's eyes.

Display 14 may include left and right display panels (e.g., left and right pixel arrays, sometimes referred to as left and right displays or left and right display portions) that are mounted respectively in left and right display modules 70 corresponding respectively to a user's left eye (and left eye box 60) and right eye (and right eye box 60). Modules 70, which may sometimes be referred to as lens support structures, lens housings, or lens and display housings, may be individually positioned relative to the housing wall structures of main unit 26-3 and relative to the user's eyes using positioning circuitry such as respective left and right positioners 58. Positioners 58 may be stepper motors, piezoelectric actuators, motors, linear electromagnetic actuators, and/or other electronic components for adjusting lens module positions. Positioners 58 may be controlled by control circuitry 12 during operation of device 10. For example, positioners 58 may be used to adjust the spacing between modules 70 (and therefore the lens-to-lens spacing between the left and right lenses of modules 70) to match the interpupillary distance of a user's eyes. This allows the user to view the left and right display portions of display 14 in the left and right lens modules. If desired, one or both of positioners 58 may also be used to adjust the position of adjustable support structures 26-1 to accommodate different face geometries. This is, however, merely illustrative. If desired, adjustable support structures 26-1 may be adjusted manually by a user.

Figure 3:
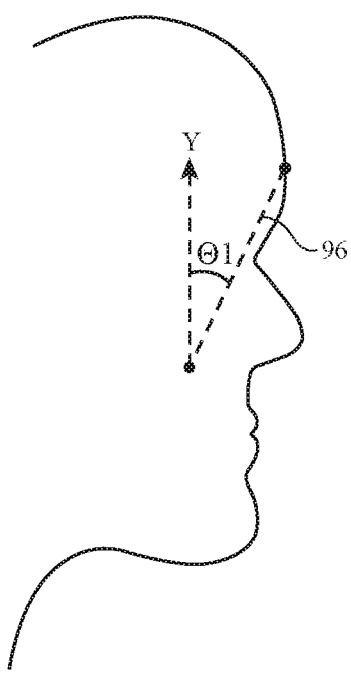
FIGS. 3 and 4 are side views of illustrative face profiles that can be accommodated using adjustable support structures in a head-mounted device in accordance with an embodiment.
Figure 4:
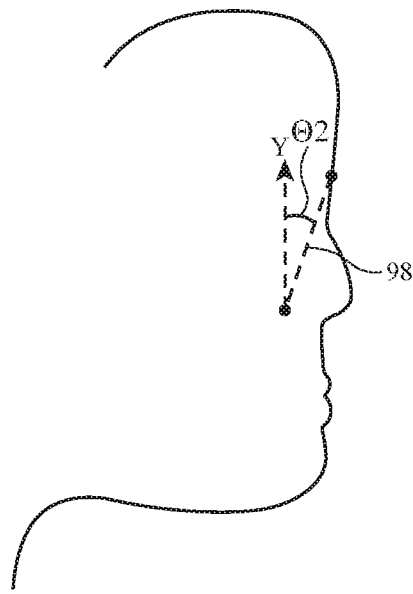
Figure 5:
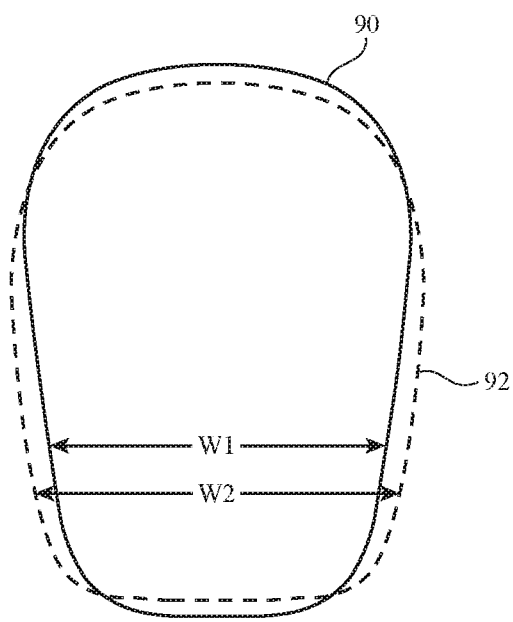
FIG. 5 is a front view of illustrative faces with different widths that can be accommodated using adjustable support structures in a head-mounted device in accordance with an embodiment.

FIGS. 3, 4, and 5 show illustrative examples of different face geometries that can be accommodated with adjustable support structures such as adjustable support structures 26-1 of FIG. 2.

The examples of FIGS. 3 and 4 illustrate how users may have different forehead and cheek positions. The prominence of a user's forehead and cheeks is significant because support structures 26-1 may have an upper surface that rests on a user's forehead and a lower surface that rests on a user's cheeks. If a user's forehead is significantly more prominent than the user's cheeks, this can lead to a backward tilt of display modules 70 (e.g., where the upper edge of display modules 70 is tilted away from the user's eyes) if care is not taken. Conversely, if a user's forehead is recessed relative to the user's cheeks, this can lead to a forward tilt of display modules 70 (e.g., where the upper edge of display modules 70 is tilted towards the user's eyes). Adjustable support structures 26-1 may be adjusted to account for the relative prominence of a user's forehead and cheeks.

In the example of FIG. 3, the user's forehead is significantly more prominent than the user's cheeks. Line 96 extending between the user's cheeks and forehead is at angle θ1 with respect to vertical axis Y. In the example of FIG. 4, the user's forehead is only slightly more prominent than the user's cheeks. Line 98 extending between the user's cheeks and forehead is at angle θ2 with respect to vertical axis Y, where θ2 is less than θ1. Adjustable support structures 26-1 may allow the position of device 10 to be adjusted to account for different cheek-to-forehead angles (e.g., θ1, θ2 and any other cheek-to-forehead angle). This ensures that display 14 is appropriately aligned with respect to the focal plane of the user's eyes, regardless of the prominence of his or her forehead and cheeks.

FIG. 5 illustrates how users may have different face widths. As shown in FIG. 5, user 90 may have face width W1 and user 92 may have face width W2, which is larger than W1. Adjustable support structures 26-1 may allow device 10 to be adjusted to account for different face widths (e.g., W1, W2, and any other suitable face width).

FIGS. 3, 4, and 5 are merely illustrative examples of ways in which face shapes and face sizes can vary. In general, device 10 may include adjustable support structures for accommodating any face shape or size.

FIGS. 6, 7, 8, 9, 10, 11, 12, and 13 show illustrative examples of adjustable support structures that may be used to accommodate different face shapes and face sizes. It should be understood that the following examples are merely illustrative of adjustable support structures. If desired, other adjustable support structures may be used instead of or in addition to the following examples. If desired, device 10 may include a combination of any two or more of the following examples of adjustable support structures.

Figure 6:
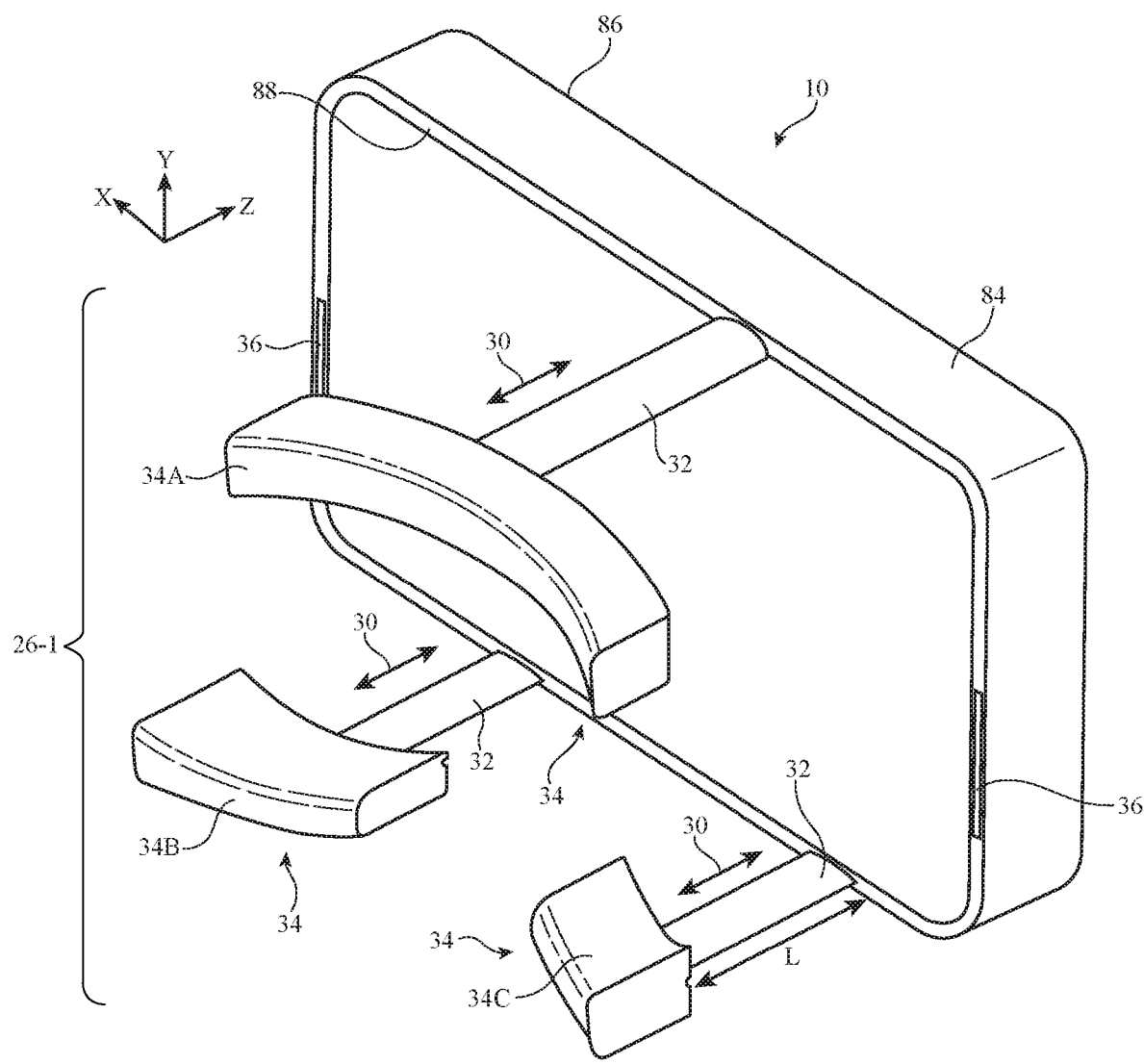
FIG. 6 is a perspective view of an illustrative head-mounted device having adjustable support structures such as extendable posts in accordance with an embodiment.

FIG. 6 is a perspective view showing an illustrative example of support structures 26-1 in device 10. As shown in FIG. 6, device 10 may include frame 84. Frame 84 may have an outer surface 86 that couples to main unit 26-3 and an inner surface 88 that faces towards the user's face. Frame 84 may include left and right attachment structures 36 for coupling frame 84 to straps 26-2 of FIG. 2. If desired, frame 84 and attachment structures 36 may form part of main unit 26-3 or may form part of adjustable support structures 26-1.

Support structures 26-1 may include one or more extendable posts 32 extending from inner surface 88 of frame 84. Each extendable post 32 may have a first end coupled to inner surface 88 of frame 84 and a second opposing end coupled to a face pad such as face pad 34. In the example of FIG. 6, there are three extendable posts 32 each coupled to an associated one of face pads 34A, 34B, and 34C. Face pad 34A may rest upon a user's forehead, and face pads 34B and 34C may rest upon a user's left and right cheeks, respectively. Each post 32 may extend and retract along direction 30 (e.g., parallel to the Z-axis of FIG. 6). The length L of each post 32 may be adjusted independently of other posts 32, if desired. The length L of each post 32 may be adjusted to 0 mm (e.g., so that the corresponding face pad 34 is contacting inner surface 88 of frame 84), between 0 mm and 2 mm, between 0 mm and 1 mm, between 1 mm and 5 mm, between 3 mm and 8 mm, greater than 8 mm, less than 8 mm, or any other suitable length.

In some arrangements, posts 32 and face pads 34 may only be configured to move linearly along direction 30 (e.g., parallel to the Z-axis). In other arrangements, posts 32 and face pads 34 may be configured to rotate about the longitudinal axis of posts 32.

Posts 32 may extend and retract using any suitable length-adjustment mechanism (e.g., using multiple telescoping tubular sections, multiple folding sections, etc.) and may be locked in place at the desired length using any suitable locking mechanism (e.g., mating grooves and protrusions, screws, magnets, friction, spring force, clutch mechanisms, etc.). Posts 32 may be locked into place at any suitable length L or may be locked into place only at predetermined lengths L. Posts 32 may be expanded and retracted using computer-controlled positioners 58 and/or may be expanded and retracted manually by a user. In arrangements where posts 32 are locked at a given length using a clutch mechanism, a user may press a button or provide other user input to unlock the clutch mechanism and thereby allow posts 32 to expand or retract. In arrangements where posts 32 are locked using friction, a user may simply pull or push posts 32 to adjust the length of posts 32. By individually adjusting the lengths L of each post 32, device 10 may be appropriately positioned on the user's face to align display modules 70 with the user's eyes, regardless of the prominence of the user's forehead and cheeks (see, e.g., FIGS. 3 and 4).

The example of FIG. 6 in which there are three posts 32 and three corresponding face pads 34 is merely illustrative. If desired, there may be fewer than three posts 32 or there may be more than three posts 32 (e.g., there may be 5, 10, 15, 20, more than 20, or less than 20 posts 32). Each post 32 may be coupled to an associated one of face pads 34, there may be multiple posts 32 coupled to each face pad 34, or there may be multiple face pads 34 coupled to each post 32.

Figure 7:
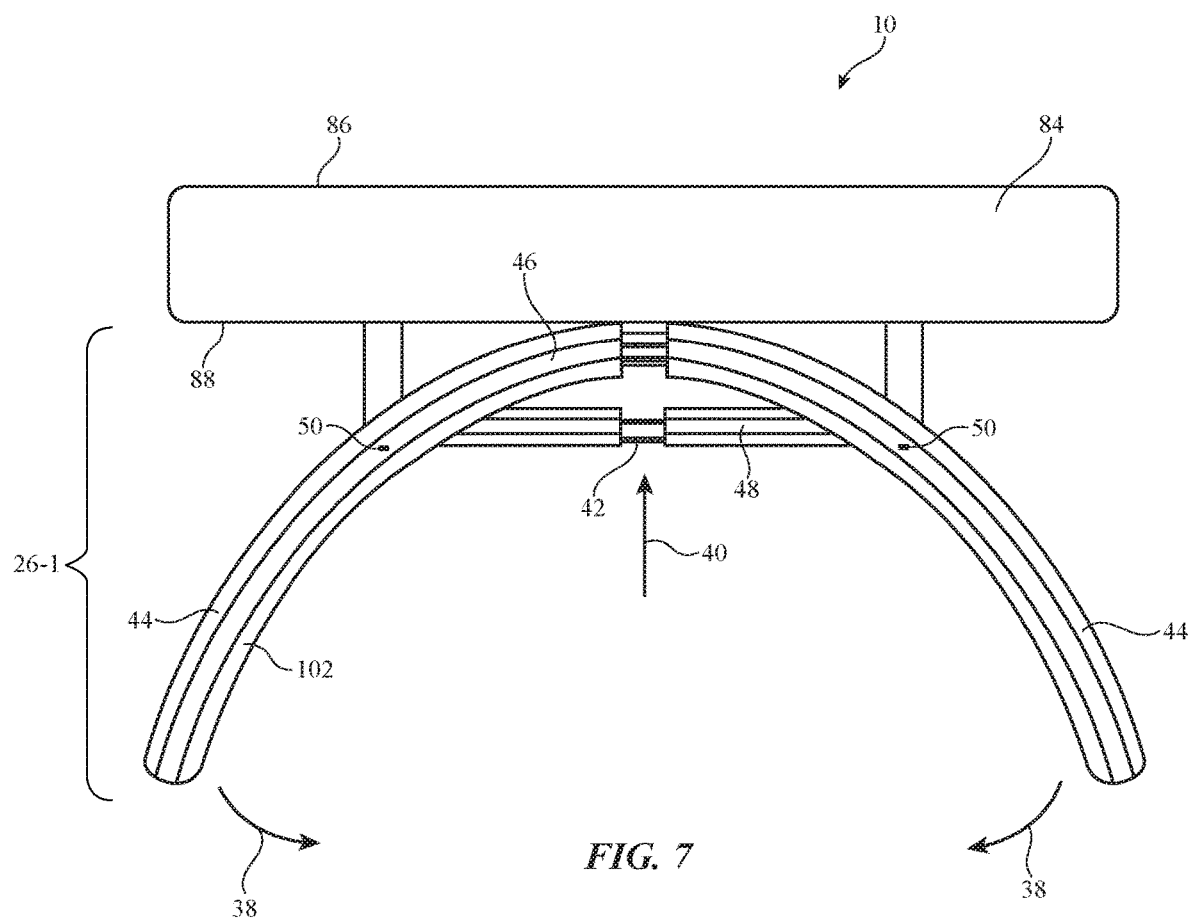
FIG. 7 is a bottom view of an illustrative head-mounted device having adjustable support structures such as a cable that pulls left and right side members towards the user's temples in accordance with an embodiment.
Figure 8:
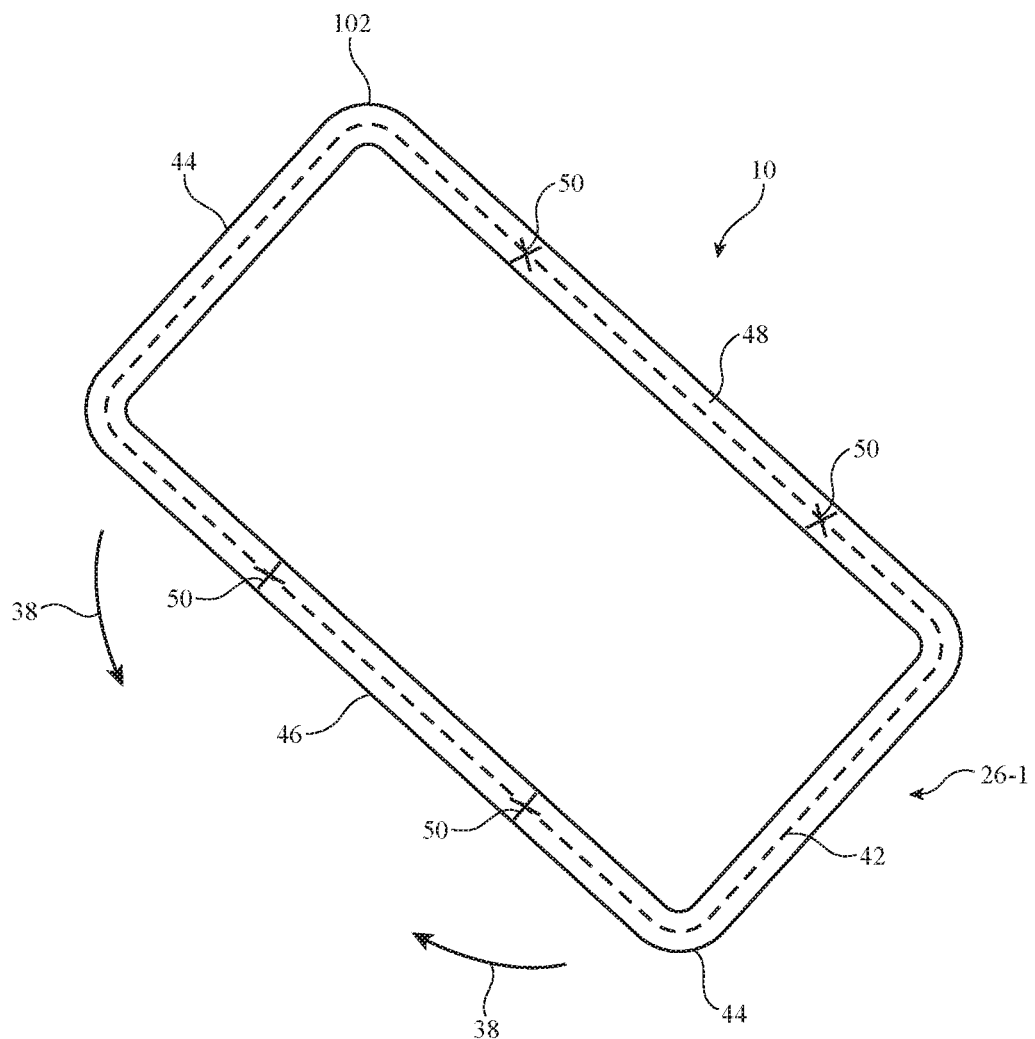
FIG. 8 is a front view of the head-mounted device of FIG. 7 in accordance with an embodiment.

FIGS. 7 and 8 show another illustrative example of adjustable support structures 26-1 in device 10. As shown in the bottom view of FIG. 7, device 10 may include frame 84. Frame 84 may have an outer surface 86 that couples to main unit 26-3 and an inner surface 88 that faces towards the user's face. If desired, frame 84 may form part of main unit 26-3 or may form part of adjustable support structures 26-1.

In the example of FIGS. 7 and 8, adjustable support structures 26-1 include flexible member 102 that rests upon the user's face. In particular, flexible member 102 may include forehead portion 48 that rests upon a user's forehead, nose portion 46 that rests adjacent to a user's nose, and left and right side portions 44 that rest upon a user's left and right cheeks or temples. A cable such as cable 42 may be located within flexible member 102. Flexible member 102 and cable 42 may have one or more pivot points such as pivot points 50. When a user places device 10 on his or her head, the user's forehead may press against forehead portion 48, which in turn presses against cable 42. Cable 42 may be held under tension within flexible member 102 such that pressure against cable 42 in direction 40 causes the portions of cable 42 in left and right side portions 44 to be pulled inwards in directions 38 (e.g., such that side portions 44 move inward towards the user's temples).

As shown in FIG. 8, flexible support member 102 may form a continuous loop that extends around the periphery of a user's eyes. If desired, cable 42 may also form a continuous loop within flexible support member 102. There may be any suitable number of pivot points 50 in flexible frame member 102. In the example of FIG. 8, pivot points 50 are located to the left of forehead portion 48, to the right of forehead portion 48, to the left of nose portion 46, and to the right of nose portion 46. When a user's forehead applies pressure to cable 42 in forehead portion 48 and/or nose portion 46, the tension of cable 42 causes side portions 48 to move toward each other in directions 38 (e.g., towards the user's temples). This mechanism may be used to adjust the width of device 10 to accommodate different face widths (see, e.g., FIG. 5).

Figure 9:
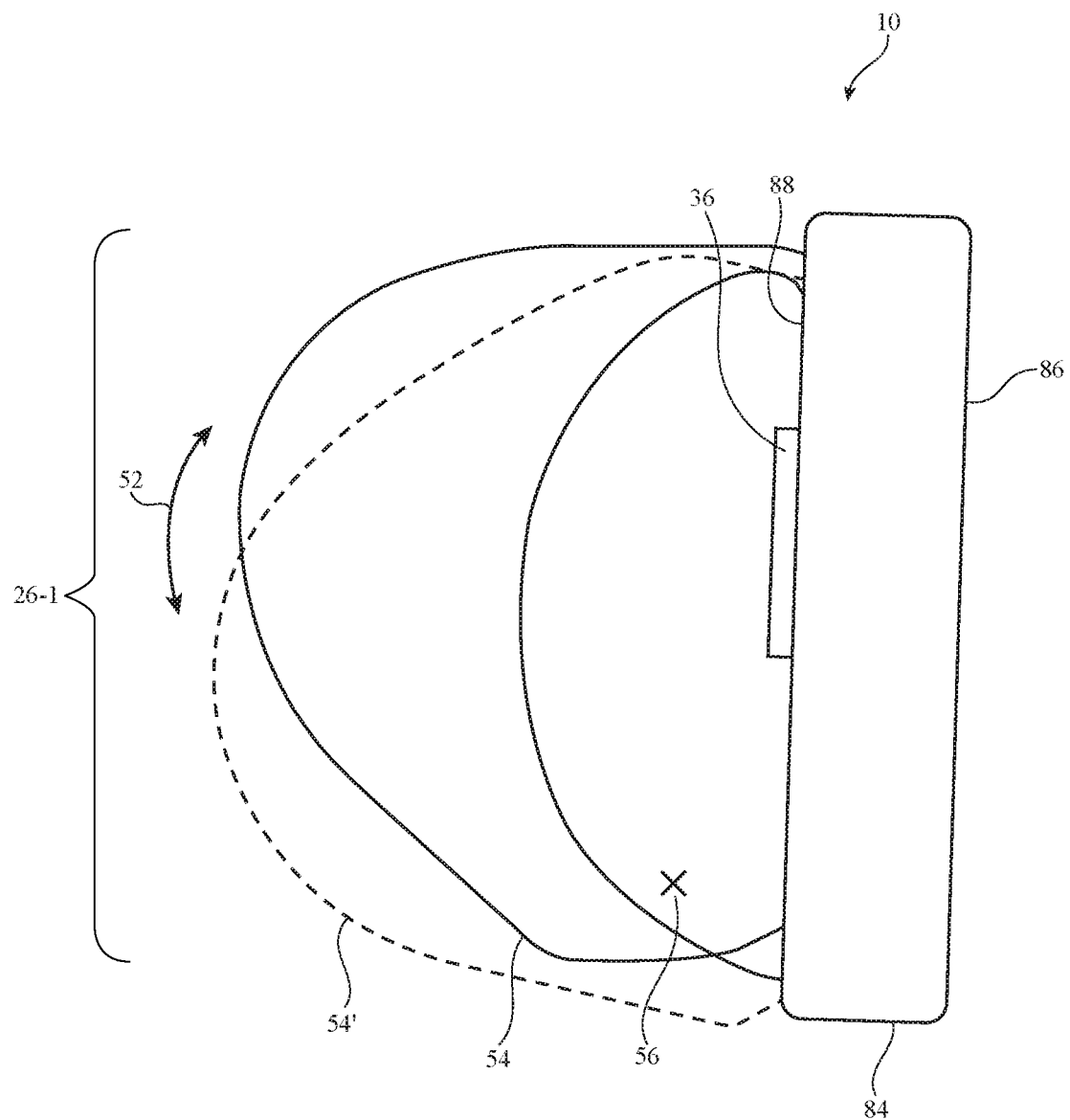
FIG. 9 is a perspective view of an illustrative head-mounted device having adjustable support structures such as a movable member that pivots about a pivot point at the bottom of the movable member in accordance with an embodiment.

FIG. 9 shows an another illustrative example of adjustable support structures 26-1 in device 10. As shown in FIG. 9, adjustable support structures 26-1 may include frame 84. Frame 84 may have an outer surface 86 that couples to main unit 26-3 and an inner surface 88 that faces towards the user's face. Frame 84 may include left and right attachment structures 36 for coupling frame 84 to straps 26-2 of FIG. 2. If desired, frame 84 and attachment structures 36 may form part of main unit 26-3 or may form part of adjustable support structures 26-1.

In the example of FIG. 9, adjustable support structures 26-1 include movable member 54. Movable member 54 may be interposed between frame 84 and the user's face. Movable member 54 may have a continuous loop shape that matches the loop shape of frame 84, or there may be a left movable member 54 that surrounds or partially surrounds the user's left eye and a right movable member 54 that surrounds or partially surrounds the user's right eye. Movable member 54 may be configured to pivot about pivot point 56. As movable member 54 pivots, movable member 54 may move along direction 52 between a vertical position (e.g., in which movable member 54 is substantially parallel to the inner surface 88 of frame 84, as indicated by solid lines 54) and a tilted position (e.g., in which movable member is tilted with respect to inner surface 88 of frame 84, as indicated by dashed lines 54'). If desired, a locking mechanism may be used to lock movable member 54 into the desired position.

Figure 10:
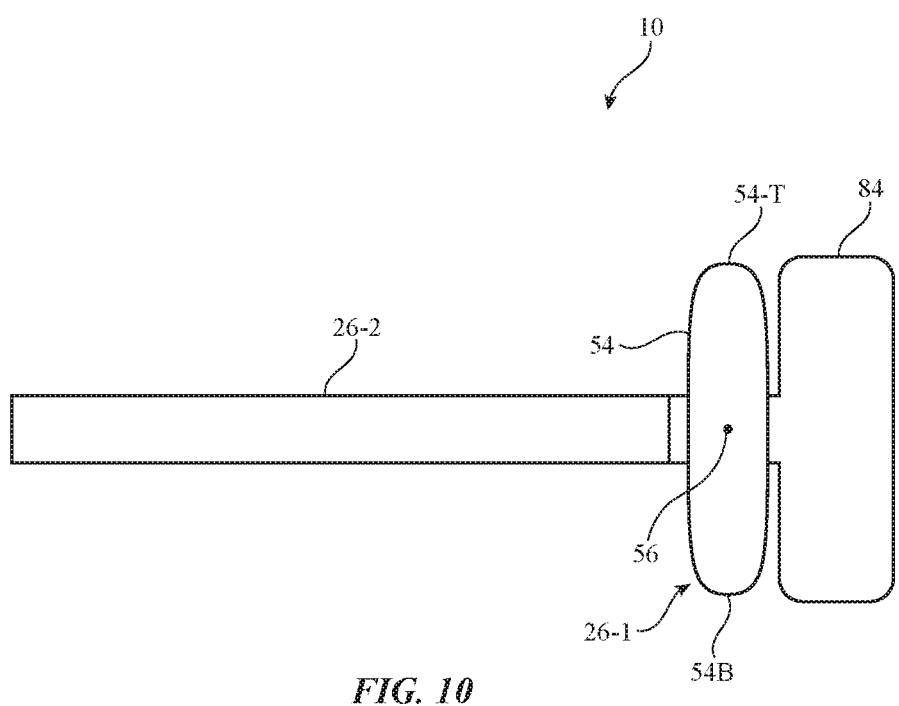
FIG. 10 is a side view of an illustrative head-mounted device having adjustable support structures such as a movable member that pivots about a pivot point at the center of the movable member in accordance with an embodiment.

The example of FIG. 9 in which pivot point 56 is located at the bottom of movable member 54 (e.g., the portion of movable member 54 that rests against a user's cheeks) is merely illustrative. If desired, pivot point 56 may be located at the top of movable member 54 (e.g., the portion of movable member 54 that rests against a user's forehead) or may be located elsewhere in movable member 54. In FIG. 10, for example, pivot point 104 is located in the middle of movable member 54. This allows top portion 54T and bottom portion 54B of movable member 54 to be tilted towards or away from frame 84.

By adjusting the position of movable member 54, device 10 may be appropriately positioned on the user's face to align display modules 70 with the user's eyes, regardless of the prominence of the user's forehead and cheeks (see, e.g., FIGS. 3 and 4).

Figure 11:
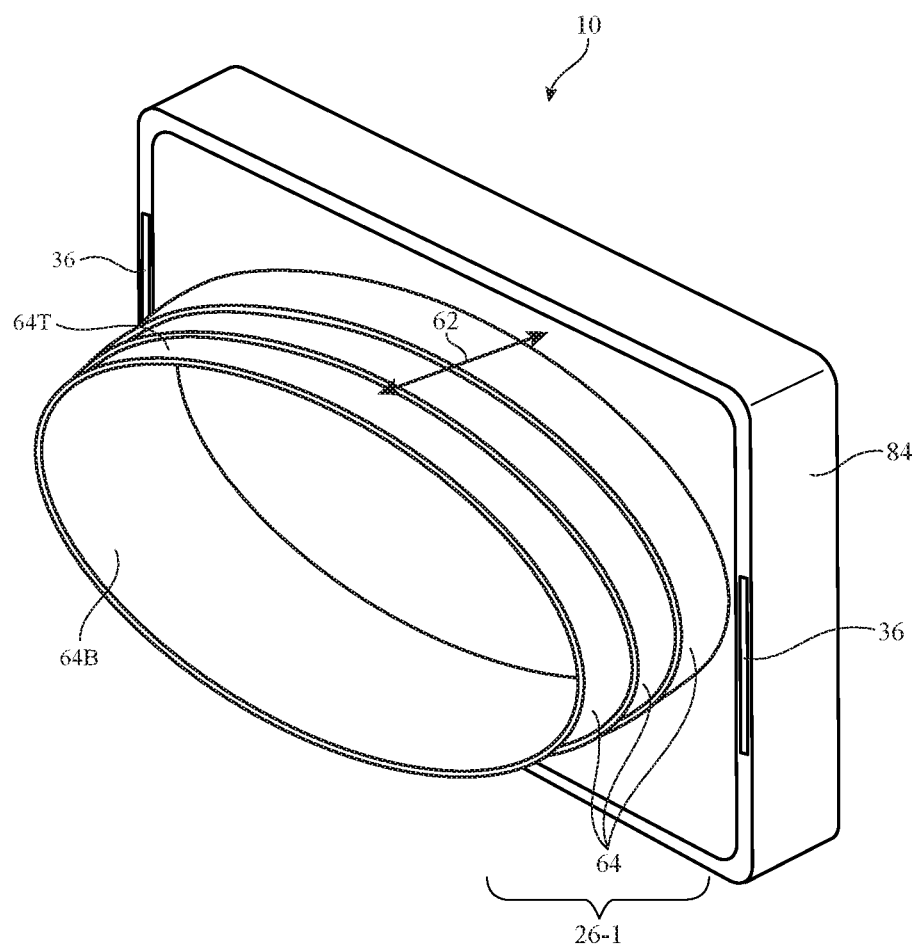
FIG. 11 is a perspective view of an illustrative head-mounted device having adjustable support structures such as a telescoping layers that expand and contract in accordance with an embodiment.

FIG. 11 shows an another illustrative example of adjustable support structures 26-1 in device 10. As shown in FIG. 11, device 10 may include frame 84. Frame 84 may have an outer surface 86 that couples to main unit 26-3 and an inner surface 88 that faces towards the user's face. If desired, frame 84 may form part of main unit 26-3 or may form part of adjustable support structures 26-1.

In the example of FIG. 11, adjustable support structures 26-1 are formed from telescoping layers of material such as layers of material 64. There may be two, three, four, more than four, or less than four telescoping layers of material 64. Each telescoping layer 64 may form a continuous loop around the periphery of a user's eyes or there may be separate sets of telescoping layers 64 for the user's left and right eyes. Telescoping layers 64 may be configured to expand and retract along direction 62. When telescoping layers 64 are in a fully retracted position, layers 64 may overlap one another near frame 84. When telescoping layers 64 are in a fully extended position, layers 64 may be spread out in direction 62. In some arrangements, each telescoping layer 64 may move as one solid piece such that expanding or contracting top portion 64T of layer 64 also expands or contracts bottom portion 64B of layer 64. In other arrangements, portions of each layer 64 may be decoupled from one another to allow for independent movement of one portion of layer 64 relative to another portion of layer 64. For example, top portion 64T of each layer 64 may be decoupled from bottom portion 64B of each layer 64, thereby allowing top portion 64T and bottom portion 64B to expand and retract independently of one another.

Layers 64 may be expanded to the desired position and locked in place using any suitable locking mechanism (e.g., mating grooves and protrusions, screws, magnets, friction, spring force, clutch mechanisms, etc.). Layers 64 may be locked at any suitable position or may only be locked at a set number of predetermined positions. In arrangements where layers 64 are locked at a given length using a clutch mechanism, a user may press a button or provide other user input to unlock the clutch mechanism and thereby allow layers 64 to expand or retract. In arrangements where layers 64 are locked using friction, a user may simply pull or push layers 64 to adjust the position of layers 64.

Figure 12:
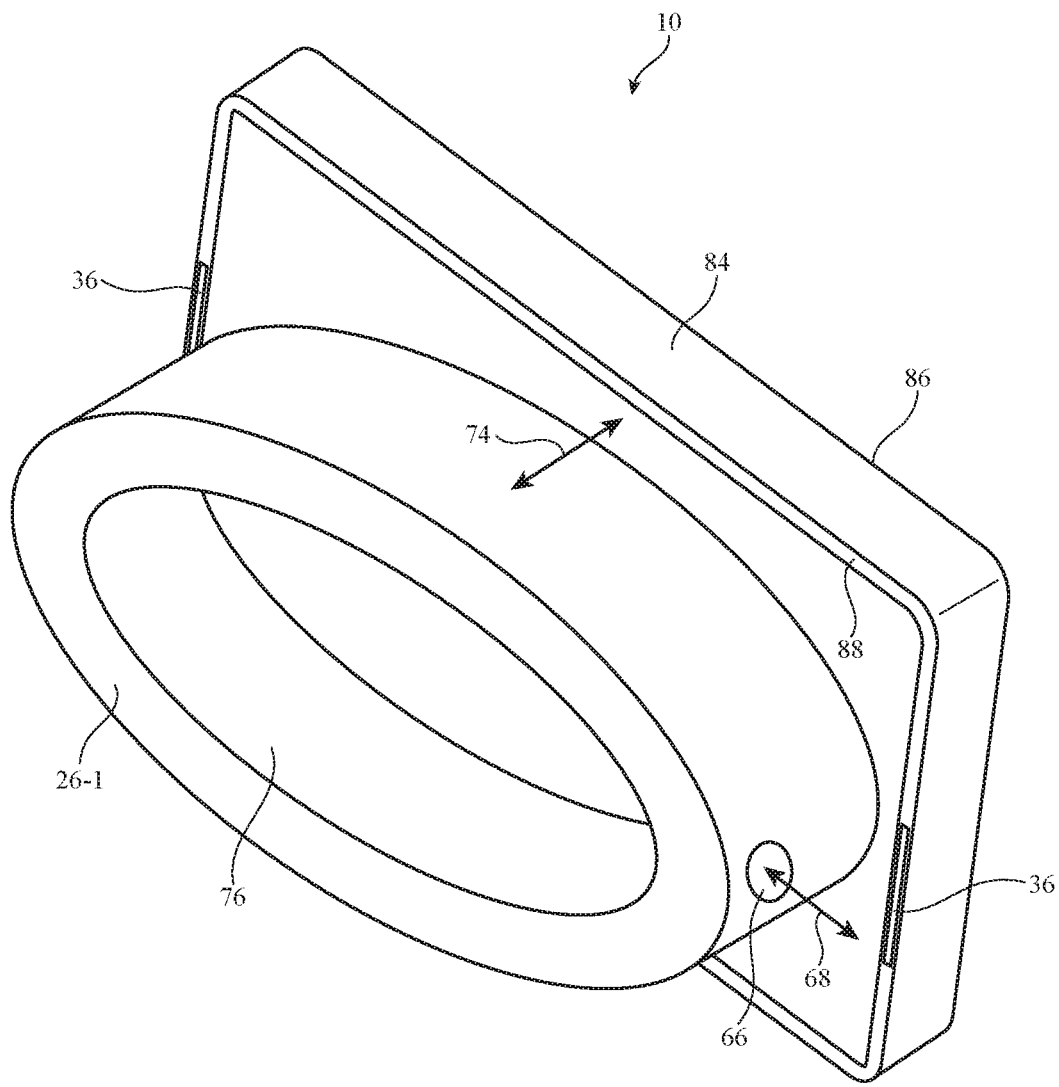
FIG. 12 is a perspective view of an illustrative head-mounted device having adjustable support structures such as an inflatable member that expands and contracts in accordance with an embodiment.

FIG. 12 shows a perspective view of another illustrative example of adjustable support structures 26-1 in device 10. As shown in FIG. 12, device 10 may include frame 84. Frame 84 may have an outer surface 86 that couples to main unit 26-3 and an inner surface 88 that faces towards the user's face. If desired, frame 84 may form part of main unit 26-3 or may form part of adjustable support structures 26-1.

In the example of FIG. 12, adjustable support structures 26-1 comprise inflatable structure 76. Inflatable structure 76 (sometimes referred to as an air bladder) may include a valve such as valve 66 through which air can enter and exit in direction 68. When air enters valve 66, inflatable structure 76 may expand along direction 74. When the inflatable structure 76 has reached the appropriate expanded position, valve 66 may be closed. When it is desired to retract and compress inflatable structure 76, valve 66 may be opened to allow air to exit inflatable structure 76.

In some arrangements, inflatable structure 76 may be inflated manually by a user (e.g., by manually blowing or otherwise forcing air into valve 66). In other arrangements, inflatable structure 76 may include a self-inflating, open-cell foam. With this type of configuration, the open-cell foam in structure 76 automatically pulls air into structure 76 when valve 66 is open, causing structure 76 to inflate and expand until the open-cell foam is full and/or until valve 66 is closed. When inflatable structure 76 reaches the appropriate expanded position, valve 66 may be closed. When it is desired to compress inflatable structure 76, valve 66 may be opened and inflatable structure 76 may be compressed, forcing the air out of the foam and out of inflatable structure 76 through valve 66.

The example of FIG. 12 in which adjustable support structures 26-1 include one inflatable structure 76 and one corresponding valve 66 is merely illustrative. If desired, adjustable support structures 26-1 may include multiple air chambers (e.g., adjustable support structures 26-1 may include two, three, four, more than four, or less than four inflatable structures 76, each having a corresponding valve 66). For example, a first inflatable structure 76 and valve 66 may be configured to rest upon a user's forehead, a second inflatable structure 76 and valve 66 may be configured to rest upon a user's left cheek, and a third inflatable structure 76 and valve 66 may be configured to rest upon a user's right cheek, if desired. This allows the expansion and contraction of individual portions of support structures 26-1 to be controlled independently of one another.

Figure 13:
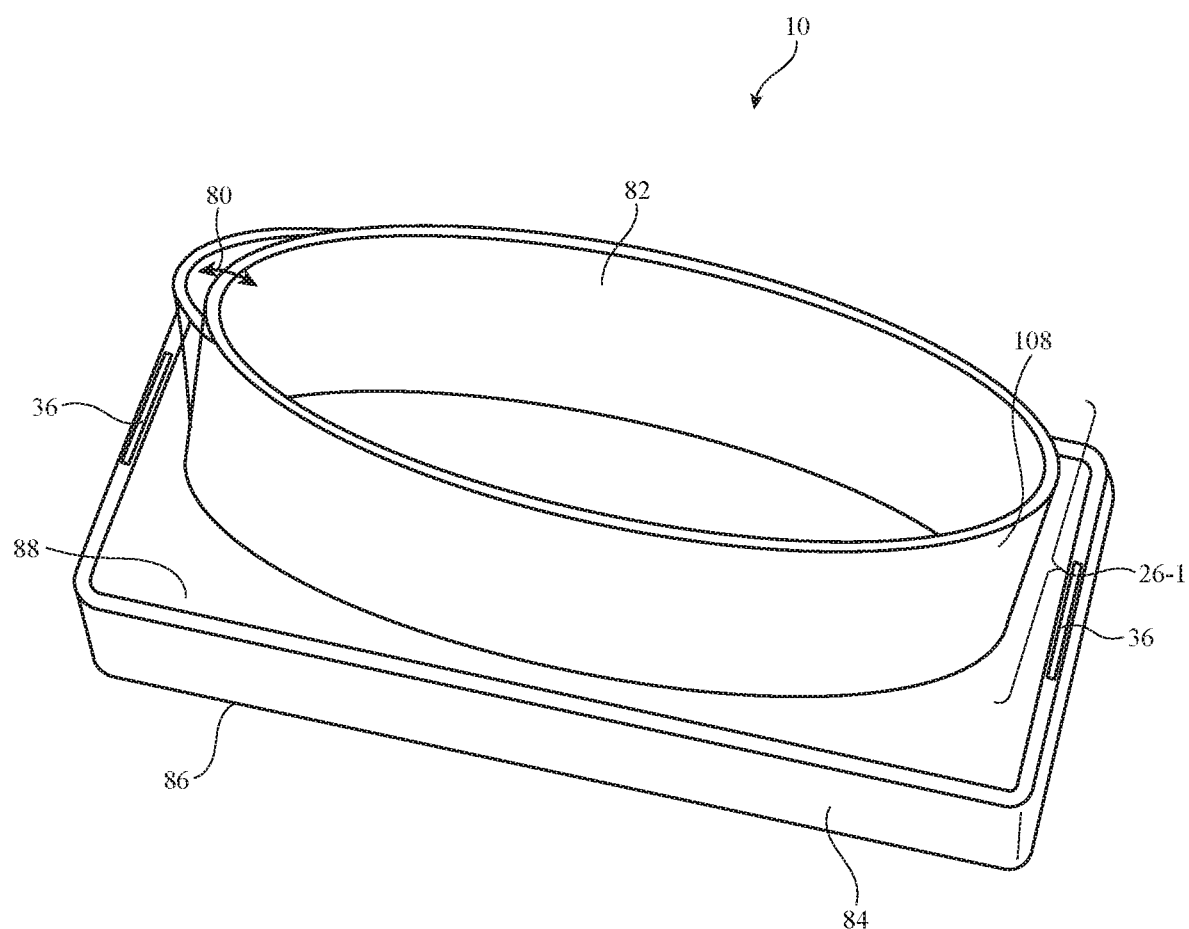
FIG. 13 is a perspective view of an illustrative head-mounted device having adjustable support structures a deformable structure in accordance with an embodiment.

FIG. 13 shows a perspective view of another illustrative example of adjustable support structures 26-1 in device 10. As shown in FIG. 13, device 10 may include frame 84. Frame 84 may have an outer surface 86 that couples to main unit 26-3 and an inner surface 88 that faces towards the user's face. If desired, frame 84 may form part of main unit 26-3 or may form part of adjustable support structures 26-1.

In the example of FIG. 13, adjustable support structures 26-1 include deformable structure 82. Deformable structure 82 may include flexible materials such as polymer, elastomer, fabric, shape memory alloy materials, thermoplastic materials that become soft and malleable when heated to an appropriate temperature (e.g., 45° C. or other suitable temperature), and/or other suitable materials. The entirety of structure 82 may be flexible or there may be rigid structures attached to or embedded within structure 82 (e.g., metal sheets, metal wires, a skeletal frame, other rigid structures, etc.). Structure 82 may have outer side portions 108. Outer side potions 108 may be configured to rest against a user's temples when device 10 is worn on a user's head. Due to the flexibility and elasticity of structure 82, outer side portions 108 of structure 82 may be configured to expand outward and retract inward in direction 80 to accommodate different face widths (see, e.g., FIG. 5).

The foregoing is merely illustrative and various modifications can be made to the described embodiments. The foregoing embodiments may be implemented individually or in any combination.

What is claimed is:

1. A head-mounted device configured to be worn on a user's head, comprising:
 a housing structure;
 a display module mounted in the housing structure; and
 adjustable support structures coupled to the housing structure, wherein the adjustable support structures comprise a first portion that rests against the user's forehead and second and third portions that rest against the user's respective left and right cheeks when the head-mounted device is worn on the user's head, wherein the adjustable support structures are configured to expand and retract, and wherein the adjustable support structures comprises posts with adjustable lengths.

2. The head-mounted device defined in claim 1 wherein the first, second, and third portions of the adjustable support structures are configured to expand and retract independently of one another.

3. The head-mounted device defined in claim 1 wherein the adjustable support structures comprise a pad located at one end of each post.

4. The head-mounted device defined in claim 1 wherein the adjustable support structures comprise an elastomeric material.

5. A head-mounted device configured to be worn on a user's head, comprising:
a housing structure;
a display module mounted in the housing structure; and
adjustable support structures coupled to the housing structure, wherein the adjustable support structures comprise a first portion that rests against the user's forehead and second and third portions that rest against the user's respective left and right cheeks when the head-mounted device is worn on the user's head, wherein the adjustable support structures are configured to expand and retract, and wherein the adjustable support structures comprise at least two telescoping layers of material.

6. The head-mounted device defined in claim 5 wherein the at least two telescoping layers of material each form a continuous loop that surrounds a periphery of the user's eyes when the head-mounted device is worn on the user's head.

7. The head-mounted device defined in claim 5 wherein the at least two telescoping layers of material each have an upper portion and a lower portion and wherein the upper portion is decoupled from the lower portion such that the upper and lower portions expand and retract independently of one another.

8. A head-mounted device configured to be worn on a user's head, comprising:
a housing structure;
a display module mounted in the housing structure; and
adjustable support structures coupled to the housing structure, wherein the adjustable support structures comprise a first portion that rests against the user's forehead and second and third portions that rest against the user's respective left and right cheeks when the head-mounted device is worn on the user's head, wherein the adjustable support structures are configured to expand and retract, and wherein the adjustable support structures comprise an inflatable structure having a valve and open-cell foam that self-inflates when the valve is open.

9. A head-mounted device configured to be worn on a user's head, comprising:
a housing structure;
a display module mounted in the housing structure; and
adjustable support structures coupled to the housing structure, wherein the adjustable support structures comprise a first portion that rests against the user's forehead and second and third portions that rest against the user's respective left and right temples when the head-mounted device is worn on the user's head, and wherein the adjustable support structures comprise a cable that pulls the second and third portions towards each other when pressure is applied to the first portion.

10. The head-mounted device defined in claim 9 wherein the adjustable support structures comprise a flexible member and wherein the cable is located in the flexible member.

11. The head-mounted device defined in claim 10 wherein the flexible member forms a loop that surrounds a periphery of the user's eyes when the head-mounted device is worn on the user's head.

12. The head-mounted device defined in claim 11 wherein the cable forms an additional loop within the flexible member that surrounds the periphery of the user's eyes when the head-mounted device is worn on the user's head.

13. The head-mounted device defined in claim 10 wherein the flexible member has first and second pivot points, wherein the first pivot point is located between the first portion and the second portion, wherein the second pivot point is located between the first portion and the third portion, and wherein the flexible member pivots at the first and second pivot points when the cable pulls the second and third portions towards each other.

14. A head-mounted device configured to be worn on a user's head, comprising:
a housing structure;
a display module mounted in the housing structure; and
adjustable support structures coupled to the housing structure, wherein the adjustable support structures comprise a movable member having a first portion that rests against the user's forehead and second and third portions that rest against the user's respective left and right cheeks when the head-mounted device is worn on the user's head, and wherein the movable member is configured to rotate about a pivot point.

15. The head-mounted device defined in claim 14 wherein the pivot point is located at the second portion.

16. The head-mounted device defined in claim 14 wherein the pivot point is located between the first and second portions.

17. The head-mounted device defined in claim 14 further comprising a strap that attaches the housing structure to the user's head, wherein the movable structure rotates relative to the strap.

* * * * *